(12) United States Patent
Ott et al.

(10) Patent No.: US 12,372,171 B2
(45) Date of Patent: Jul. 29, 2025

(54) SELF-LOCKING THREADED CONNECTION PARTIALLY IN NON-LOCKING ENGAGEMENT

(71) Applicants: VALLOUREC OIL AND GAS FRANCE, Aulnoye-aymeries (FR); NIPPON STEEL CORPORATION, Chiyoda-ku (JP)

(72) Inventors: Wesley Ott, Meudon (FR); Logan Van Gorp, Meudon (FR); Scott Granger, Meudon (FR)

(73) Assignees: VALLOUREC OIL AND GAS FRANCE, Aulnoye-aymeries (FR); NIPPON STEEL CORPORATION, Chiyoda-ku (JP)

( * ) Notice: Subject to any disclaimer, the term of this patent is extended or adjusted under 35 U.S.C. 154(b) by 178 days.

(21) Appl. No.: 18/250,306

(22) PCT Filed: Oct. 20, 2021

(86) PCT No.: PCT/EP2021/079122
§ 371 (c)(1),
(2) Date: Apr. 24, 2023

(87) PCT Pub. No.: WO2022/090034
PCT Pub. Date: May 5, 2022

(65) Prior Publication Data
US 2023/0400126 A1    Dec. 14, 2023

(30) Foreign Application Priority Data

Oct. 28, 2020 (EP) .................................. 20204267

(51) Int. Cl.
*F16L 15/06*     (2006.01)
*E21B 17/043*    (2006.01)
*F16L 15/00*     (2006.01)

(52) U.S. Cl.
CPC ............ *F16L 15/06* (2013.01); *E21B 17/043* (2013.01); *F16L 15/001* (2013.01)

(58) Field of Classification Search
CPC ............................... F16L 15/06; E21B 17/043
See application file for complete search history.

(56) References Cited

U.S. PATENT DOCUMENTS 7,494,159 B2    2/2009  Sugino et al.
8,925,975 B2 *  1/2015  Granger ................ E21B 17/042
                                               285/333
(Continued)

FOREIGN PATENT DOCUMENTS

CN    100529498 C    8/2009
CN    102257306 B    7/2013
(Continued)

OTHER PUBLICATIONS

International Search Report Issued Feb. 9, 2022, in PCT/EP2021/079122, filed on Oct. 20, 2021, 3 pages.

*Primary Examiner* — David Bochna
(74) *Attorney, Agent, or Firm* — Oblon, McClelland, Maier & Neustadt, L.L.P.

(57) ABSTRACT

A flush self-locking threaded connection partially in a non-locking engagement comprises a first and a second tubular component provided respectively with male and female threaded zone at their respective ends. First portions of the male and female threaded zones with varying thread width and root cooperate along a self-locking tightening arrangement. A locking region within the threaded connection is located in the middle of non-locking regions, and radially centered to the pipe body API tolerances in order to withstand high torque and seal performances.

19 Claims, 4 Drawing Sheets

(56) References Cited

U.S. PATENT DOCUMENTS

| | | | |
|---|---|---|---|
| 10,415,322 B2 | 9/2019 | Besse | |
| 10,519,724 B2* | 12/2019 | Martin | F16L 15/06 |
| 11,840,895 B2* | 12/2023 | Langford | E21B 17/043 |
| 11,898,666 B1* | 2/2024 | Owoeye | F16L 15/06 |
| 11,940,064 B2* | 3/2024 | Owoeye | F16L 15/06 |
| 12,018,777 B2* | 6/2024 | Wada | F16L 15/06 |
| 12,049,790 B2* | 7/2024 | Ott | E21B 17/043 |
| 2010/0171305 A1* | 7/2010 | Roussie | F16L 15/06 |
| | | | 285/333 |
| 2011/0278838 A1 | 11/2011 | Martin et al. | |
| 2014/0145433 A1 | 5/2014 | Hou et al. | |
| 2016/0115742 A1 | 4/2016 | Martin et al. | |
| 2016/0161031 A1 | 6/2016 | Martin et al. | |
| 2016/0186899 A1 | 6/2016 | Besse | |
| 2022/0252188 A1* | 8/2022 | Oku | F16L 15/06 |
| 2024/0229985 A1* | 7/2024 | Delbosco | F16L 15/06 |

FOREIGN PATENT DOCUMENTS

| | | |
|---|---|---|
| CN | 104812990 B | 5/2017 |
| CN | 105392956 B | 9/2017 |
| CN | 111566309 B | 5/2022 |
| EP | 3 514 431 B1 | 4/2020 |
| WO | WO 2013/038072 A1 | 3/2013 |
| WO | WO 2014/187873 A2 | 11/2014 |
| WO | WO 2016/108141 A1 | 7/2016 |

* cited by examiner

SELF-LOCKING THREADED CONNECTION PARTIALLY IN NON-LOCKING ENGAGEMENT

BACKGROUND OF THE INVENTION

The present invention relates to a self-locking threaded connection partially in a non-locking engagement. One of the aims of the invention is to optimize reliability and cost efficiency for customers running shale gas operations, and especially to increase well integrity of such shale gas wells. The connection according to the invention is able to withstand high tension and compression loads and high torques while remaining flush to pipe outer diameter and inner diameter allowing the end user to drill with larger production casing to increase drilling efficiencies. The flush connection will also increase the area available to the end user increasing the production rates. The connection could also be used for special applications such as drilling with casing, even in wells with complex configurations, such as directional and horizontal wells. Therefore, the invention proposes a threaded joint for casings able to withstand a severe test program of combined loads such as tension and compression, internal and external pressure, and bending.

The present invention design is particularly suited for intermediate casing, and especially for casing used for fracking.

A threaded connection usually comprises a first and a second tubular component, one being provided with a male member at an end of a first pipe body, and the other being provided with a female member at an end of a second pipe body, each of said members being provided with a threaded zone.

In known fashion, it is conventional to connect male and female members by make-up of the male threaded zone with the female threaded zone, the assembly defining a connection.

Meanwhile, in a case of an integral connection type, both first and second pipe body are steel pipes, and steel pipes adjacent to each other are directly connected to each other without using a coupling. Such integral connections require less space in the well than connections using a coupling.

However, adjacent steel pipes being of the same outer diameter and of the same wall thickness, end forming of both pipe ends are needed to provide them with those threaded zones. In other words, the threaded zones are formed in the wall thickness of the pipes and therefore have a limited thickness. This result in less connection efficiency especially for flush connections in which the outer diameter of the threaded connection in the made-up threaded zones remains quite the same as the pipe body outer diameter. Preferably, the outer diameter of the threaded connection shall remain below 101% of the pipe body nominal outer diameter in a flush connection.

A string of tubular components thus constituted may also be rotated when drilling with casing of the well. For this reason, the components must be made up together with a high torque in order to be able to transmit a rotational torque which is sufficient to allow the string to be advanced into the well and also not to break it out. When rotational movement is provided to the string to progress the pipe, the rotational movement is progressively transmitted from pipe bodies with the largest diameter to the smaller ones of the string which are at the deepest location.

For conventional products, the make-up torque is generally reached thanks to cooperation by tightening of abutment surfaces provided at a free end of the pipe bodies to abut in a made-up position with a corresponding shoulder surface. However, because the extent of abutment surfaces is a fraction of the thickness of the tubes, the critical plastication threshold of the abutment surfaces is rapidly reached when too great a make-up torque is applied, especially when it concerns pipe bodies with small diameters.

A major issue of those connection is also to provide enough seal performances when they are placed at their proper location in the well. Production process will expose connection to fluid with strong variation of internal pressure within the casing. Thus, integral connections have to optimize both torque capacity and seal performance at the same time, while dealing with liquid sealability needs.

Document U.S. Pat. No. 7,661,728 teaches an integral treaded connection with enough torque capacity wherein the connection is not having any abutment surfaces, but rely on two threaded zones with low taper thread and both threaded zones being in a self-locking arrangement. Both threaded zones comprise threads of the male end (also named pin member) and threads of the female end (also named box member) having a constant lead but variable thread widths, because a stab lead of the stab flanks is not equal to a load lead of the load flanks. That type of thread is said to have wedge threads. According to that document, seal performance is provided with a metal-to-metal seal in order to reach premium seal performances for both liquid and gas. Male and female members each respectively comprise a sealing surface which cooperate with each other in tightening contact (also termed contact with interference) when the threaded zones cooperate following self-locking make-up.

Conventionally, the threads (or teeth) of the male end have a pin thread crest, a pin thread root, a pin load flank, and a pin stab flank. The threads (or teeth) of the female end have a box thread crest, a box thread root, a box load flank, and a box stab flank. More precisely with locking wedge threads, the widths of the crests of the threads (or teeth) increase progressively for the threads of the male end or female end respectively with increasing distance from the male axial end or female axial end respectively.

Non locking wedge threads are characterized by having a Load Flank lead LFL and Stab Flank lead SFL which are the same. Locking wedge threads are characterized by a wedge ratio, which is a non-zero difference between Load Flank lead LFL and Stab Flank lead SFL, Load Flank lead LFL being either strictly greater or strictly smaller than Stab Flank lead SFL, difference being calculated with the respective lead values. In conventional locking wedge threads, LFL of both pin member and box member are equal, and respectively, SFL of both pin member and box member are also equal. Thus, wedge ratios are the same for both the pin member and the box member. During make-up, the male and female threads (or teeth) finish by locking into each other in a predictable position corresponding to a locking point.

More precisely, locking occurs for self-locking threading when both the stab flanks and the load flanks of the male threads (or teeth) lock against respectively the stab flanks and the load flanks of the corresponding female threads (or teeth). For this reason, the make-up torque is taken by all of the contact surfaces between those flanks, i.e. a total surface area which is very substantially greater than that constituted by abutment surfaces of the prior art.

A connection as disclosed in document U.S. Pat. No. 7,661,728 requires space for the seal portions and does not provide both high tension and compression efficiency nor high torque performances.

There is a need for a flush connection with higher torque, faster make-up, more economical to manufacture and lower handling damage risk, especially for small pipe body outer diameter sizes between 76.2 mm (3 inches) and 152.4 mm (6 inches) in which the wall thickness available for the threading zones is limited. Those needs combine with a need for a connection efficiency above 70% of the pipe body.

For this reason, and especially for pipe body of outer diameter below 346 mm (13⅝ inch), there is a very specific need for solution able to withstand such tension and torque requirement, for instance for shale specific requirements, such as cyclical fatigue due to rotation of the string during installation of a casing in lateral section of wells and later exposure to high internal pressure, bending and high temperature from the hydraulic fracturing process. Severe test programs including water sealability testing, also made under bending conditions were performed. These needs are especially important in flush connections.

BRIEF SUMMARY OF THE INVENTION

For this reason, the aim of the invention is to provide a semi-premium, flush connection having self locking thread, such that the locking thread provide a seal sufficient to withstand seal to liquid, but also sufficient to provide enough tension and torque capacity. In addition to the above requirement to be solved, there is a need such a connection be with reasonable manufacturing costs, in terms of number of passes with the machining insert tool on both pin and box members.

More precisely, the invention provides a threaded connection comprising a first tubular component and a second tubular component,
the first tubular component comprising a first pipe body and a male member, the male member being arranged at a distal end of the first pipe body, an external peripheral surface of the male member comprising at least one male threaded zone, said at least one male threaded zone being arranged along a longitudinal axis of the threaded connection between the first pipe body and a male terminal surface,
the second tubular component comprising a second pipe body and a female member, the female member being arranged at a distal end of the second pipe body, an internal peripheral surface of the female member comprising at least one female threaded zone, said at least one female threaded zone being arranged along the longitudinal axis of the threaded connection between the second pipe body and a female terminal surface,
the male threaded zone having a first male threaded portion and a second male threaded portion, the first male threaded portion being arranged along the longitudinal axis of the threaded connection between the second male threaded portion and the first pipe body, a width of the thread roots of the first male threaded portion decreasing in a direction oriented from the male terminal surface towards the first pipe body, a width of the thread roots of the second male threaded portion being constant, said width of the thread roots of the second male threaded portion presenting a minimum root width of the male threaded zone, a male thread closest to the male terminal surface presenting a maximum root width value of the male threaded zone,
the female threaded zone comprising a first female threaded portion and a second female threaded portion, the first female threaded portion being arranged along the longitudinal axis of the threaded connection between the second female threaded portion and the second pipe body, a width of the thread roots of the first female threaded portion decreasing along a direction oriented from the female terminal surface towards the second pipe body, a width of the thread roots of the second female threaded portion being constant, said width of the thread roots of the second female threaded portion presenting a minimum root width of the female threaded zone, a female thread closest to the female terminal surface presenting a maximum root width value of the female threaded zone,
wherein the first male treaded portion and the first female threaded portion are partially made up in a self-locking arrangement in order to provide a locking region in the threaded connection and wherein the threaded connection is a flush connection.

The threaded connection according to the above features provides a semi-premium flush connection, for instance dedicated to shale applications, having self locking threads, such that the locking threads provide a seal sufficient to seal to liquid, but also sufficient to provide enough torque capacity.

Such a connection is obtained with reasonable manufacturing costs, in terms of number of paths with the machining insert tool on both pin and box members.

Thanks to the locking region in which the male threaded zone and the female threaded zone are only partially made-up in a self-locking arrangement, no specific make up torque chart is required to follow during assembly, as torque chart for a connection according to the invention allows for a basic make up signature and wider tolerances than average torque window for prior art connection. This advantage is significant in order to lower cost for running that type of connection.

Another advantage of a connection having such partially made-up self-locking arrangement according to the present invention is that the make-up torque is achievable with rig's torque capacity, and that the connection may be made up in 1.5 turns after hand tight when both stab and load flanks are contacting each other, more likely connection according to the invention requires less than 5 turns from stabbing to final make-up position.

In an embodiment, an outer diameter of the female member is below 101% of an outer diameter of the second pipe body.

According to an embodiment, a width of the thread crests of the first male threaded portion increase in a direction oriented from the male terminal surface towards the first pipe body, a width of the thread crests of the second male threaded portion being constant, said width of the thread crests of the second male threaded portion presenting a maximum crest width of the male threaded zone, a male thread closest to the male terminal surface presenting a minimum crest width value of the male threaded zone.

According to an embodiment, a width of the thread crests of the first female threaded portion increase in a direction oriented from the female terminal surface towards the second pipe body, a width of the thread crests of the second female threaded portion being constant, said width of the thread crests of the second male threaded portion presenting a maximum crest width of the female threaded zone, a female thread closest to the female terminal surface presenting a minimum crest width value of the female threaded zone.

According to an embodiment, the first male threaded portion comprises at least 90% of perfect threads. According to an embodiment, the first female threaded portion comprises at least 90% of perfects threads.

Such perfect threads have the same flank height along the threaded zone. Thanks to these features, the threaded connection has enough perfect threads in the locking region to ensure a good bearing efficiency of the connection.

According to an embodiment, the locking region comprises at least 90% of perfect threads. According to an embodiment, the first male threaded portion comprises at least 90% of the perfect threads of the male threaded zone. According to an embodiment, the first female portion comprises at least 90% of the perfect threads of the female threaded zone.

Locking region of the connection in a made-up state may preferably represent more than 55%, for instance 60%, of the total make up length of engaged male and female threads.

According to an embodiment, the locking region is located between a first non-locking region and a second non-locking region.

In the first non-locking region, the load flanks and/or the stab flanks of the male threaded zone are distant from the corresponding load flanks or stab flanks of the female threaded zone in the made-up state of the threaded connection. In the second non-locking region, the load flanks and/or the stab flanks of the female threaded zone are distant from the corresponding load flanks or stab flanks of the male threaded zone in the made-up state of the threaded connection. According to an embodiment, the first non-locking region is arranged on one longitudinal side of the locking region and the second non-locking region is arranged on the other longitudinal side of the locking region.

According to an embodiment, the male threaded zone comprises a single continuous spiral such that a lead of the male stab flanks changes at a single male stab flanks changing location on the male threaded zone, and the female threaded zone comprises a single continuous spiral such that a lead of the female stab flanks changes at a single female stab flank changing location on the female threaded zone, the male stab flank changing location and the female stab flank changing location being at different locations along the longitudinal axis of the threaded connection such that the locking region is defined between the male stab flank changing location and the female stab flank changing locations, and wherein a lead of the male load flanks remains constant along the male threaded zone and a lead of the female load flanks remains constant along the female threaded zone.

According to an embodiment of the invention, the male threaded zone comprises a single continuous spiral such that a lead of the male load flanks changes at a single male load flank changing location on the male threaded zone, and the female threaded zone comprises a single continuous spiral such that a lead of the female load flanks changes at a single female load flank changing location on the female threaded zone, the male load flank changing location and female load flank changing location being at different locations along the longitudinal axis of the threaded connection such that the locking region is defined between the male load flank changing location and the female load flank changing location, and wherein a lead of the male stab flanks remains constant along the male threaded zone and a lead of the female stab flanks remains constant along the female threaded zone.

For example, a wedge ratio in the locking region is below 0.2 mm.

In an embodiment, the wedge ratio in the locking region is between 0.1 and 0.2 mm. Thanks to these wedge ratios, the middle passes required for manufacturing the threaded zones is reduced, thus reducing the time and costs requested for manufacturing the threaded connection.

According to an embodiment, the male and female threaded zones have a taper generatrix forming a taper angle with the longitudinal axis of the threaded connection. Preferably, a taper corresponding to tan(taper angle) is in the range of 1/6 to 1/18, and preferably selected in the range of 1/6 to 1/10 and even more preferably around 1/8.

According to an embodiment, crests and roots of the male and female threads of the threaded zones are parallel to the taper generatrix in the locking region.

According to an embodiment, a middle locking location M is identified at axial half length of the locking region such that a pitch line diameter TDavg at the middle locking location M is as follows $$(ODmin+IDmin) \div 2 < TDavg < (ODmax+IDmax) \div 2$$

In which ODmin is a minimal pipe body outer diameter, i.e. a nominal pipe body outer diameter as defined for instance by API minus the manufacturing tolerances, Idmin is the minimal male element inner diameter, i.e. or a drift minimum outer diameter as defined for instance in API, ODmax is a maximum pipe body outer diameter, i.e. a nominal pipe body outer diameter as defined for instance by API plus the manufacturing tolerances, and Idmax is the maximum male element inner diameter, i.e. or a drift maximum outer diameter as defined for instance in API.

The pitch line is a line defined by the halfway between the crest and the root of the threads on the load flank of a threads. Thus, the average pitch line diameter TDavg at the middle locking location M is an average radial distance between the longitudinal axis of the threaded connection and said pitch lines at the middle locking location M. Thanks to the above proposed definition of the pitch line diameter TDavg at the middle locking location M, the perfect locking threads arranged in the locking region are maximized and, consequently, the compression efficiency of the connection is improved. Moreover, the above proposed definition of the pitch line diameter Tdavg at the middle locking location M is useful to adapt connection definition according to the invention to all type of pipe body sizes.

According to an embodiment, a middle locking location M is identified at axial half length of the locking region such that a length Lnl from that middle locking location M to a longitudinal side of the locking region is such that $$Lnl \geq (TDavg - BCCSD - 2 \times THpitch) \div taper$$

In which THpitch is a radial distance from pitch line to root or crest in the locking region, or in other words half of the radial distance between the root and the crest of the threads in the locking region, BCCSD is the female member critical cross section diameter, also named box critical cross section diameter, taper is the taper of the threaded zone The above proposed definition of the length Lnl from that middle locking location M to a longitudinal side of the locking region is useful to improve the compression efficiency of the connection. Moreover, such a definition of said length ensures that the width of the threads close to the terminal surfaces in the male and/or female threaded zones remain large enough to not compromise the connection in either shear or jump-out. This definition of said length is useful to adapt connection definition according to the invention to all type of pipe body sizes taking into account thread height.

According to an embodiment, the female member critical cross section diameter BCCSD in the above-mentioned equation regarding the length Lnl from the middle location M to a longitudinal side of the locking region is replaced by the male member critical cross section diameter PCCSD. In other words, Critical Cross Section Diameter in the above-mentioned equation can be applied to male member or female member. For the female member, also named box, BCCSD is the first root outside diameter of the female member directly above the last female member thread root in which a male thread crest is engaged after make-up. For male member, also named pin, PCCSD is the root inside diameter of the male member directly below the last male member thread root in which a female member thread crest is engaged after make-up.

Preferably, maximum root width value of the male threaded zone is set below twice the minimum root width value of the male threaded zone and/or maximum female root width value of the female threaded zone is set below twice the minimum root width value of the female threaded zone. In other words, $$WRb\max \leq 2*WRb\min$$

And/or $$WRp\max \leq 2*WRp\min.$$

This reduces the number of middle passes for manufacturing and therefore allows for cheaper machining costs.

According to an embodiment, the root of a female thread which is closest to the second pipe body has the same root width as a root of the male thread which is closest to the first pipe body. In other words, in an embodiment $WRb\min = WRp\min$.

According to an embodiment, respective threads of the second male threaded portion and/or the second female threaded portion have imperfect thread height and or vanishing thread teeth.

According to an embodiment, the female threaded zone starts as of the female terminal surface and the male threaded zone starts as of the male terminal surface.

Preferably to avoid jump out, threads of the male threaded zone and threads of the female threaded zone may have a dovetail profile, and, $\alpha$ and $\beta$ are the load and respectively stab flank angle with a perpendicular to the longitudinal axis of the threaded connection, both $\alpha$ and $\beta$ being less than 5°.

In an embodiment, the load flank angle is between 1° and 3°. In a flush connection, the male threads close to the male terminal surface and the female threads close to the female terminal surface are almost fully engaged. Thanks to a load flank angle above 1°, the risk of jump-out is reduced. Moreover, thanks to a load flank angle below 3°, the crest width remains large enough to require few middle passes of an insert to manufacture the threaded zones even if the root widths increase. Furthermore, such a load angle below 3° allows a low wedge ratio which increases the flank area available in the threaded zones and improves the performance in torque and shear of the connection. In an embodiment, the stab flank angle is 4°.

According to an embodiment, both the crests of the male threads and the crests of the female threads are interfering with corresponding roots in the locking region, such that the diameter interference at the root/crest interference is between 0.0020 and 0.0030 times the pipe body nominal outer diameter.

According to an embodiment, a diameter interference at the root/crest interference is defined as greater than $0.4*((OD-2*Wtmin)*EUL$
in which OD is the nominal outer diameter of the pipe body,
Wtmin is the minimal wall thickness of the pipe body, said minimum wall thickness being defined for instance in API 5CT as remaining pipe body wall*wall thickness, and
EUL is an elongation under load for a minimum grade, for instance 0.005.

Such a minimal root/crest interference Yi ensure a good sealing behavior of the connection.

According to an embodiment, the threaded connection is free from any distal abutment surface, the male terminal surface being axially away from the female member, and respectively the female terminal surface being axially away from the male member.

According to an embodiment, both male and female member are free of any additional sealing surfaces beside the locking region.

According to an embodiment, the first tubular component and the second tubular component are integral, each of the first tubular component and the second tubular component comprising a male member and a female member.

According to an embodiment, the male threaded zone and the female threaded zone are made of single start threads.

BRIEF DESCRIPTION OF THE SEVERAL VIEWS OF THE DRAWINGS

The characteristics and advantages of the invention are disclosed in more detail in the following description made with reference to the accompanying drawings.

DETAILED DESCRIPTION OF THE INVENTION

By convention, the terms "outer" or "external" and "inner" or "internal" are used to define the relative position of one element with respect to another or the orientation of such an element, with reference to a longitudinal axis X of the threaded connection, an element or a surface close/facing the longitudinal axis X being qualified as "inner" or "internal" and an element or a surface away from/facing away the longitudinal axis X being qualified as "outer" or "external". The radial direction is defined as perpendicular to the longitudinal axis X of the threaded connection.

Figure 1:
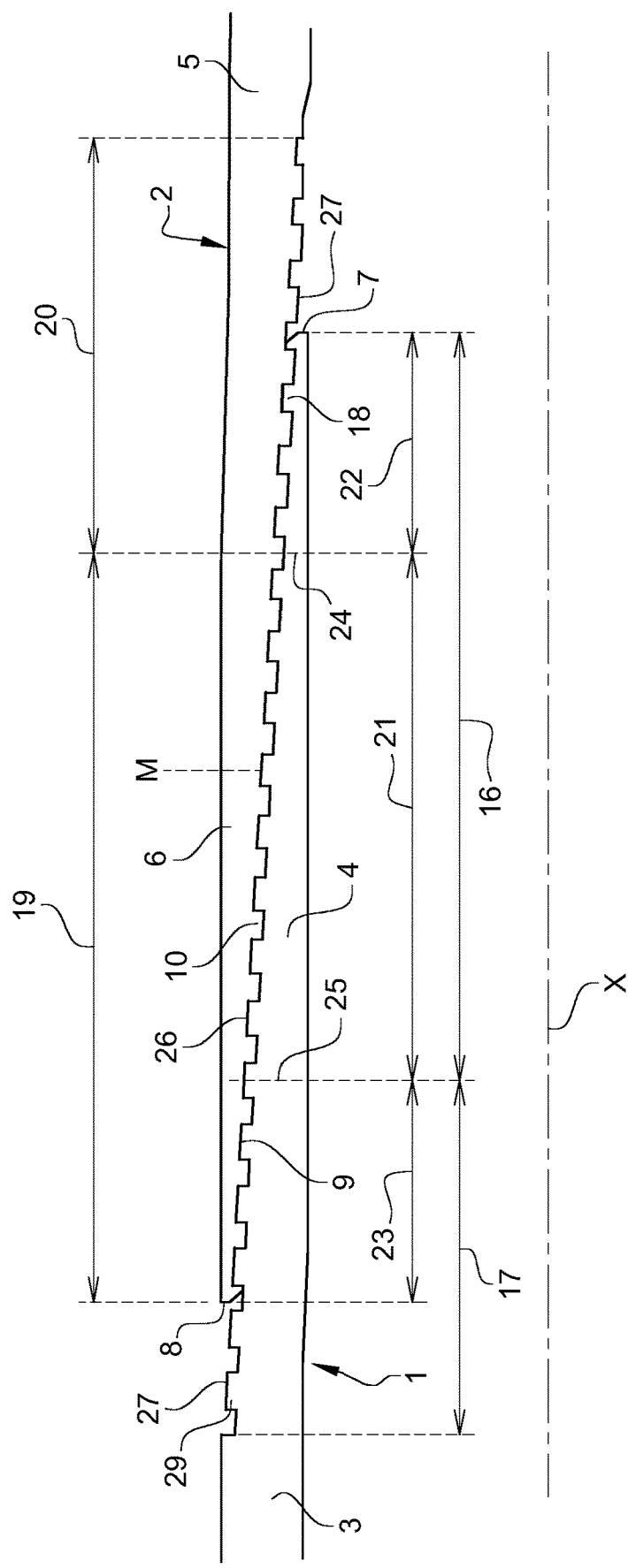
FIG. 1 is a longitudinal cross-sectional view of one half of a connection comprising a self-locking threading in accordance with the invention, in a made-up state.

The threaded connection shown in FIG. 1, hereafter name connection, comprises a first tubular component 1 and a second tubular component 2. Both first tubular component 1 and second tubular component 2 are integral, as they are both provided with a respective pipe body, a male member at a first distal end of the pipe body and a female member at a second distal end of the pipe body. Thus, as shown on FIG. 1, the first tubular component 1 is provided with a first pipe body 3 and a first male member 4, hereafter named male member 4. Male member 4 extends from a first distal end of the first pipe body 3. The second tubular component 2 is provided with a second pipe body 5 and a second female member 6, hereafter female member 6. Female member 6 extends from a second distal end of the second pipe body 5.

In a made-up state of the connection as shown in FIG. 1, the male member 4 and the female member 6 are connected such that a longitudinal axis X of the connection is coaxial with the first tubular component 1 and the second tubular component 2, said longitudinal axis X defining an axial direction of the connection.

Both tubular components 1, 2 are made out of steel, and, in one example carbon martensitic steel, with yield strength able to range from 80 ksi (550 MPa) to 140 ksi (965 MPa).

For example, grade of the material is between 80 ksi (550 MPa) and 140 ksi (965 MPa). For example, grade is above 100 ksi (690 MPa), for example equal to 125 ksi (860 MPa).

Pipe bodies 3, 5 may be with a nominal outer diameter between 3½ "(88.90 mm) and 13⅝" (346 mm), and pipe bodies wall thickness from 8 to 22 mm. Preferably, pipe bodies 3, 5 have a nominal outer diameter below 10" (254 mm), and even more preferably below 6"(152.4 mm).

An end of the male member 4 opposed to the first pipe body 3 finishes in a male terminal surface 7. This male terminal surface 7 forms an axial free end of the male member 4 or pin face. The male terminal surface 7 is also a free axial surface of the first tubular component 1. An end of the female member 6 finishes in a female terminal surface 8. This female terminal surface 8 forms an axial free end of the female member 6 or box face. The female terminal surface 8 is also a free axial surface of the second tubular component 2. The male terminal surface 7 and the female terminal surface 8 are oriented radially with respect to a longitudinal axis X of the connection. None of the male terminal surface 7 and the female terminal surface 8 are placed in abutment contact at the end of make-up. In other words, the male terminal surface 7 is axially away from the second tubular component 2 and the female terminal surface 8 is axially away from the first tubular component 1.

Figure 7:
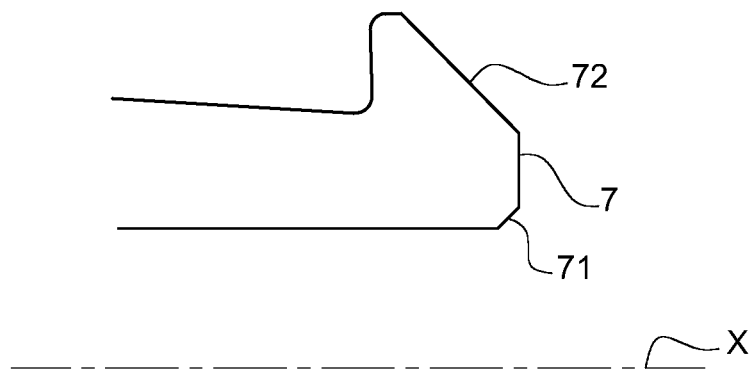
FIG. 7 is a detailed longitudinal cross-sectional view of one half of a distal end of a male member of a connection in accordance with the invention.
Figure 8:
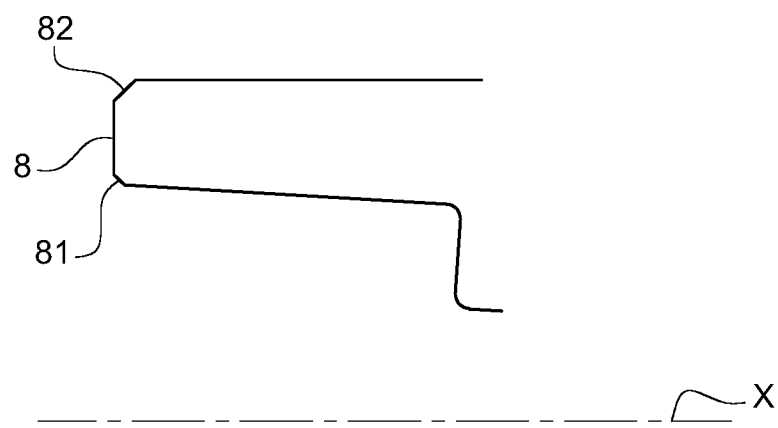
FIG. 8 is a detailed longitudinal cross-sectional view of one half of a distal end of a female member of a connection in accordance with the invention.

As shown on FIGS. 7 and 8, the male terminal surface 7 and the female terminal surface 8 are perpendicular to the longitudinal axis X. Chamfers 71, 72, 81 and 82 are machined from the terminal surface 7 and 8 respectively toward inner and outer surfaces. For example, according to a preferred embodiment of the invention, all chamfers 71, 72, 81, 82 are 45° chamfers versus the plane of the respective terminal surfaces 7 and 8. Chamfer 71 is machined from the male terminal surface 7 toward an inner surface of the male member 4 and chamfer 81 is machined from the female terminal surface 8 toward an inner surface of the female member 6. Chamfers 72 is machined from the male terminal surface 7 toward an outer surface of the male member 4 and chamfer 82 is machined from the female terminal surface 8 toward an outer surface of the female member 6.

Figure 3:
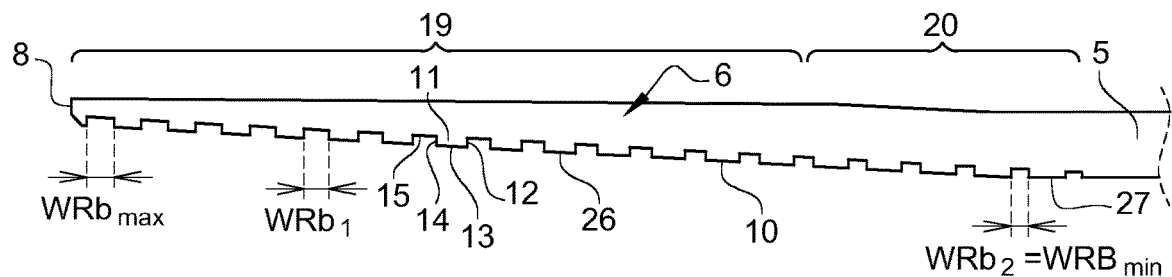
FIG. 3 is a longitudinal cross-sectional view of one half of a female member of a connection in accordance with the invention.
Figure 4:
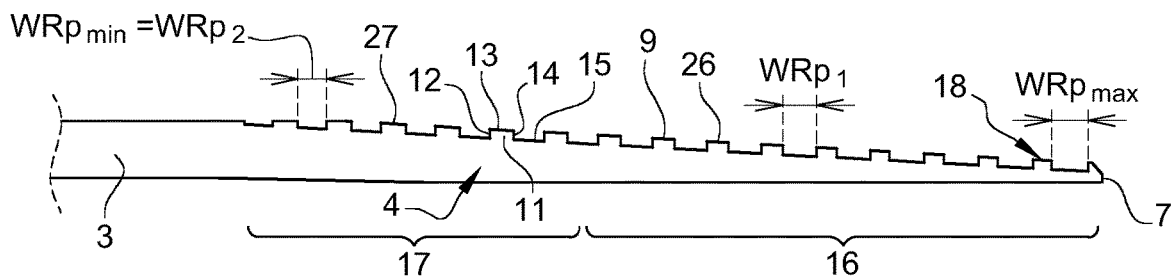
FIG. 4 is a longitudinal cross-sectional view of one half of a female member of a connection in accordance with the invention.

As shown on FIGS. 1, 3 and 4, the male member 4 is provided with a male threaded zone 9 and the female member 6 is provided with a female threaded zone 10. The male threaded zone 9 and the female threaded zone cooperate for mutual connection by make-up of the two tubular components 1, 2. Threaded zones 9, 10 are respectively machined. In FIG. 1, the threaded tubular connection is shown fully made up.

According to the present invention, connection efficiency is above 70% of the pipe body yield strength.

The male threaded zone 9 and the female threaded zone 10 are tapered with a taper angle θ (see FIG. 6), said taper angle θ being the same for both the male threaded zone 9 and the female threaded zone 10. This taper angle θ is an angle between a generatrix of the male threaded zone 9 and/or the female threaded zone 10 and the longitudinal axis X of the connection. The taper, corresponding to tan(θ), is for instance in the range of ⅙ to ¹/₁₈, and preferably selected in the range of ⅙ to ¹/₁₀ and even more preferably around ⅛. Preferably, a taper value may be ⅛ or ⅙, corresponding respectively to taper angle θ of 3.6° and 4.8°.

Male threaded zone 9 and female threaded zone 10 are single start according to an embodiment of the invention. Single start means that each of the male threaded zone 9 and the female threaded zone 10 have a respective unique and single threaded spire with no interruption, spire being a continuous helix.

As shown in FIG. 1 or 4, the male threaded zone 9 starts as of the male terminal surface 7. As shown in FIG. 1 or 3, the female threaded zone starts as of the female terminal surface 8. Each of the male threaded zone 9 and the female threaded zone 10 comprise a plurality of teeth or threads 11 formed by the threaded spire. Each thread 11 comprises a load flank 12, a crest 13, a stab flank 14 and a root 15.

The male threaded zone 9 has a first male threaded portion 16 and a second male threaded portion 17. The second male threaded portion 17 is arranged along the longitudinal axis X between the first male threaded portion 16 and the first pipe body 3. In the first threaded portion 16, an axial width of the thread root $WR_{p1}$ decreases along a direction oriented from the male terminal surface 7 towards the first pipe body 3 and an axial width of the crests increases along said direction oriented from the male terminal surface 7 towards the first pipe body 3. In the second threaded portion 17, an axial width of the thread root $WR_{p2}$ remains at a minimum constant width value $WR_{pmin}$ and the axial width of the crests remains constant at a maximum width value. A thread 18 of the male threaded zone 9 closest to the male terminal surface 7 presents a maximum axial root width value $WR_{pmax}$ of the male thread threaded zone 9.

The female threaded zone 10 has a first female threaded portion 19 and a second female threaded portion 20. The second female threaded portion 20 is arranged along the longitudinal axis X between the first female threaded portion 19 and the second pipe body 5. In the first female threaded portion 19, an axial width of the thread root $WR_{b1}$ decreases along a direction oriented from the female terminal surface 8 towards the second pipe body 5 and an axial width of the crests increases along said direction oriented from the female terminal surface 8 towards the second pipe body 5. In the female second threaded portion 20, the axial width of the thread root $WR_{b2}$ remains at a minimum constant width value $WR_{bmin}$ and the axial width of the crests remains constant at a maximum width value. A thread 29 of the female threaded zone 10 closest to the female terminal surface 8 presents a maximum axial root width value $WR_{bmax}$ of the female threaded zone 10.

The first male threaded portion 16 and the first female threaded portion 19 are partially made up in a self-locking arrangement, which means that some threads 11 of the first male threaded portion 16 and first female threaded portion 19 are in a self-locking make-up arrangement and some thread 11 of the first male threaded portion 16 and first female threaded portion 19 are not in a self-locking make-up arrangement.

In such a "self-locking" configuration, the male threads 11, like the female threads 11, have a constant lead although their crest width respectively decreases towards their respective terminal surface 7, 8 and their root width respectively increases towards their respective terminal surface 7, 8. During make-up, the male and female threads 11 finish by locking into each other in a determined position thanks to this variation in the crests and roots widths.

When made up, the connection of the invention is comprising a locking region 21, a first non-locking region 22 and a second non-locking region 23.

The locking region 21 is defined by the location along the longitudinal axis X in which, in the made-up state of the connection, the threads 11 of both the first male threaded portion 16 and the first female threaded portion 19 are engaged. The first non-locking region 22 is defined by the location along the longitudinal axis X in which, in the made-up state of the connection, the threads 11 of the first male threaded portion 16 are engaged with the threads 11 of the second female threaded portion 20. The second non-locking region 23 is defined by the location along the longitudinal axis X in which, in the made-up state of the connection, the threads 11 of the second male threaded portion 17 are engaged with the threads 11 of the first female threaded portion 19.

In the locking region 21, as within the first male threaded portion 16 and first female threaded portion 19 there is a progressive variation of the axial crests width, and correspondingly a progressive variation of the axial roots width, a progressive axial tightening is produced between the threads 11 of the first male threaded portion 16 and the threads 11 of the first female threaded portion 19 during make-up until a final locking position. In such a final locking position, threads 11 of the first male threaded portion 16 are such that all the stab flanks 14 and all the load flanks 12 of said threads 11 of the first male threaded portion 16 located in the locking region 21 lock against one another respectively the stab flanks 14 and the load flanks 12 of the corresponding threads 11 of the first female threaded portion 19 in the locking region 21. In other words, the threads 11 of the first male threaded portion 16 and the threads of the first female threaded portion 19 are engaged in "self-locking" arrangement in the locking region 21.

Figure 6:
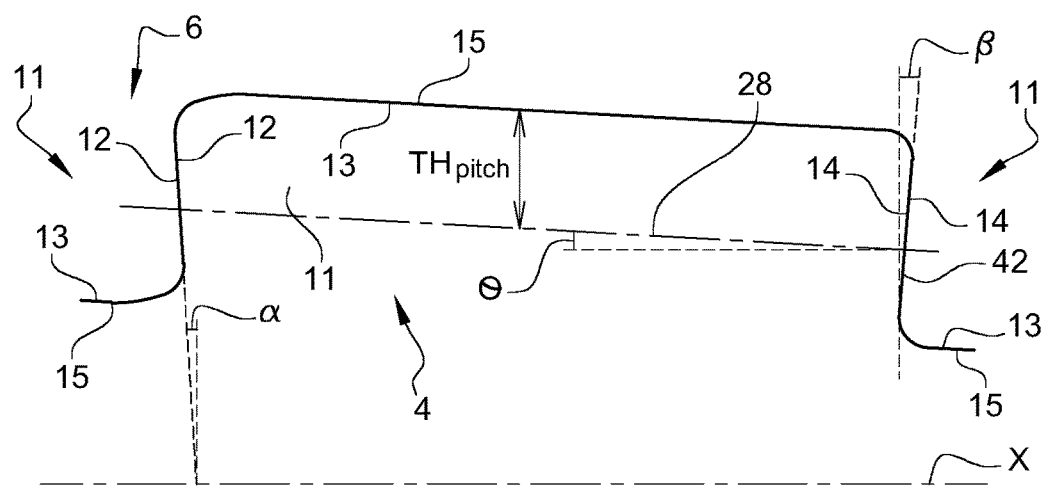
FIG. 6 is a detailed longitudinal cross-sectional view of a male thread of the male end made up with a female tooth of the female according to an embodiment of a connection in accordance with the invention.

At the end of makeup, in the locking region 21 as shown FIG. 6, there is no axial gap between axial flanks, i.e. both load flanks 12 and stab flanks 14, of the threads 11. Moreover, design of the connection according to the invention is such that there is no radial gap between thread crests 13 and female threads root 15 in the locking region 21, both between the thread crests 13 of the male member 4 and the thread roots 15 of the female member 6 and also between thread crests 13 of the female member 6 and thread roots of the male member 4. Thus, the locking region 21 forms a seal by generating enough contact to trap dope and withstand high pressure. Crests 13 and roots 15 are in interfering contact, and axial flanks 12, 14 interfere too. Crests 13 and roots 15 of the male threaded zone 9 and the female threaded zone 10 in the locking region 21 are parallel to the taper generatrix of the threaded zones 9, 10.

In order to ensure a good sealing behavior of the connection, the diameter interference at the root/crest interference is between 0.0020 and times the pipe body (3, 5) nominal outer diameter. In an embodiment to ensure a good sealing behavior of the connection, a diameter interference at the root/crest interference is defined as greater than $0.4*(OD-2*Wtmin)*EUL$ in which OD is the nominal outer diameter of the pipe body, Wtmin is the minimal wall thickness of the pipe body, said minimum wall thickness being defined for instance in API 5CT as the remaining pipe body wall*wall thickness, and EUL is an elongation under load for a minimum grade, for instance 0.005.

In the first non-locking region, the threads 11 of the first male threaded portion 16 are engaged with threads 11 of the second female threaded portion 20. In said first non-locking region 22, as the width of the roots 15 in the second female threaded portion 20 remains constant while the width of the crests 13 in the first male threaded portion 16 decreases from the locking region 21 towards the male terminal surface 7, the threads 11 of the first male threaded portion 16 in said first non-locking region 22 are not in contact, either considering their load flanks 12 and/or their stab flanks 14, with the corresponding load flanks 12 and/or stab flanks 14 of the second female threaded portion 20. In other words, the threads 11 of the first male threaded portion 16 in the first non-locking region 22 are not in a self-locking arrangement as they have at least one of their load flanks 12 or stab flank 14 not in contact with any corresponding surface of the female threaded zone an axial clearance existing between them.

Similarly, the teeth 11 of the first female threaded portion 19 in the second non-locking region 23 are not in contact, either considering their load flanks 12 and/or their stab flanks 14, with the corresponding threads 11 of the second male threaded portion 17. In other words, the threads 11 of the first female threaded portion 19 in the second non-locking region 23 are not in self-locking arrangement as they have at least one of their load flank 12 or stab flank 14 not in contact with any corresponding surface of the male threaded zone 9, an axial clearance existing between them.

In a preferred embodiment, a positive clearance exists between respective male and female stab flanks 14 in both the first non-locking region 22 and the second non-locking region 23. For example, that clearance is at least 1 mm, and for example below 5 mm.

The second male threaded portion 17 is closer to the first pipe body 3 than the first male threaded portion 16, such that the second male threaded portion 17 is engaged with threads 11 of the female threaded zone 10 close to the female terminal surface 8. Thus, the second non-locking region 23 is located along the longitudinal axis X between the locking region 21 and the female terminal surface 8. Similarly, the second female threaded portion 20 is closer to the second pipe body 5 than the first female threaded portion 19, such that the second female threaded portion 20 is engaged with male threads 11 of the male threaded zone 9 close to the male terminal surface 7. Thus, the first non-locking region 22 second portion 16 is located along the longitudinal axis X between the locking region 21 and the male terminal surface 7. The first non-locking region 22 is adjacent to a first longitudinal side 24 of the locking region 20 and the second locking region 23 is adjacent to a second longitudinal side 25 of the locking region 21, said second longitudinal side 25 being axially opposed to the first longitudinal side 24 of the locking region 20.

Advantageously and as shown in FIG. 6, threads 11 of the male threaded zone 9 and threads 11 of the female threaded zone 10 have a dovetail profile. This dovetail profile enables to avoid the risk of jump-out, which corresponds to the male threaded zone 9 and the female threaded zone 10 coming apart when the connection is subjected to large bending or tensile stresses. More precisely, the geometry of the dovetail threads increases the radial rigidity of their assembly compared with threads, which are usually termed "trapezoidal" threads wherein the axial thread width reduces from the roots to the crest of the threads. Advantageously, the load flanks 12 of the threads 11 connect to the thread crests and to the adjacent thread roots by roundings such that these roundings reduce the stress concentration factor at the foot of the load flanks 12 and thereby improve the fatigue behavior of the connection.

Along a longitudinal section of the connection, both load flank 12 and stab flank 14 present a straight profile. Load flank 12 and stab flank 14 are respectively making negative angle $\alpha$, respectively negative angle $\beta$ with a direction perpendicular to the longitudinal axis X. Load flank angle value $\alpha$ is inferior or equal to stab flank angle value $\beta$, while being opposed and defined on opposed sides of a direction perpendicular to the longitudinal axis X. For example, angles $\alpha$ and $\beta$ are comprised between 1° and 5°. Thus, the width of a root 15, at the bottom of the interval between two adjacent threads 11, is always the largest dimension of that thread when considering the width of a thread along the longitudinal axis X.

Figure 2:
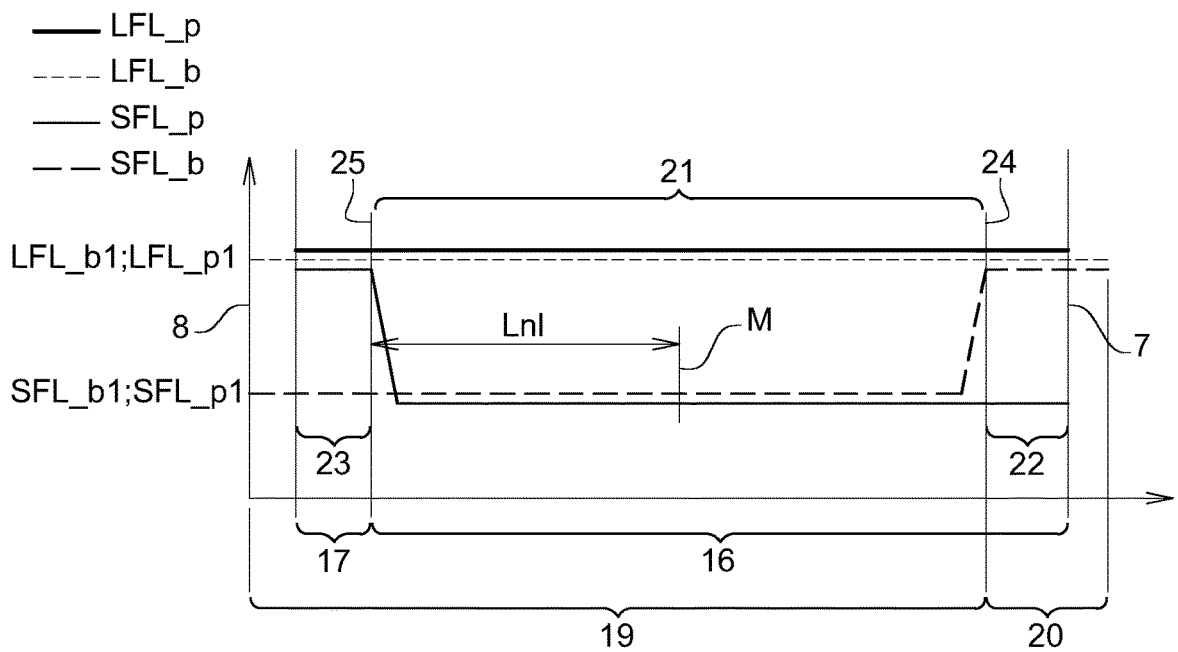
FIG. 2 is a graph according to a first embodiment of the invention, showing the evolution of the leads of the load flanks and the stab flanks for respectively the male member and female member along the threads of the male and female member in accordance with FIG. 1 in between distal end surfaces of the male member and respectively the female member, when the connection is made up. Lead values of respectively male stabbing flanks (SFL_p), male loading flanks (LFL_p), female stabbing flanks (SFL_b), and female loading flanks (LFL_b) along y-axis, with x-axis representing the location of the thread along a longitudinal axis of the tubular component.

According to the first embodiment as shown on FIG. 2, a first male stab flank lead SFL_p between the stab flanks 14 in the first male threaded portion 16 is constant at a value SFL_p1. A first male load flank lead LFL_p1 between the load flanks 12 in the first male threaded portion 16 is also constant but at a value LFL_p1 which is different from the first male stab flank lead SFL_p1. In the example of FIG. 6, LFL_p1 is strictly superior to SFL_p1. For a first example of the first embodiment of the invention:
LFL_p1=8.33 mm
SFL_p1=8.20 mm
For a second example of the first embodiment of the invention:
LFL_p1=10 mm
SFI_p1=9.87 mm
Thus, a wedge ratio of the first male threaded portion 16, which is the difference between the load flank lead LFL_p1 and the stab flank lead SFL_p1, for both examples are below 0.15 mm.

Within the scope of the invention, other stab flank lead SFL_p1 and load flank lead LFL_p1 values are acceptable.

Similarly, a first female load lead LFL_b1 between the load flanks 12 of the first female threaded portion 19 is constant at a value LFL_b1 and a first female stab flank lead SFL_b1 between the stab flanks 14 of the first female threaded portion 19 is also constant but at a value SFL_b1 which is different from LFL_p1, with the feature that the first female load flank lead LFL_b1 is greater than the first female stab flank lead SFL_b1.

Further, as represented FIG. 2, the first male stab flank lead SFL_p1 and the first female stab flank lead SFL_b1 are equal and smaller than the respective first male load flank lead LFL_p1 and first female load flank lead LFL_b1, which are themselves equal.

More specifically, LFL_b1=LFL_p1 and SFL_b1=SFL_p1.

According to FIG. 2, in the second non-locking region 23, a second male stab flank lead SFL_p2 and a second male load flank lead LFL_p2 are equal to each other, and equal to the first male load flank lead LFL_p1 as of the location of the second longitudinal side 25 of the locking region 10. In other words, a male stab flank lead changing location from the first male stab flank lead SFL_p1 to the second male stab flank lead SFL_p2 between the first male threaded portion 16 and the second male threaded portion 17. This change of the male stab flank lead while the male load flank lead remains constant define the transition between the first male threaded portion 16 and the second male threaded portion 17, and consequently the junction between the second non-locking region 23 and the locking region 21.

Similarly, within the first non-locking region 22, a second female stab flank lead SFL b2 and a second female load flank lead LFL b2 are equal to each other, and also equal to the first female load flank lead LFL_b1 as of the location of the first longitudinal side 24 of the locking region 21. Thus, similarly to the second non-locking region 23, a female stab flank lead changing location defines the transition between the first female threaded portion 19 and the second female threaded portion 20, and consequently the junction between the first non-locking region 22 and the locking region 21.

The first longitudinal side 24 of the locking region 21 and the second longitudinal side 25 of the locking region 21 are defined by the location where stab flank leads change on respective threaded zones 9, 10. Both male and female threaded zones 9, 10 have a unique change in stab flank lead value, whereas load Flank leads remain constant all along the threaded zones 9, 10. Changes are sudden, and appear in less than one turn, preferably less than 180°.

Figure 5:
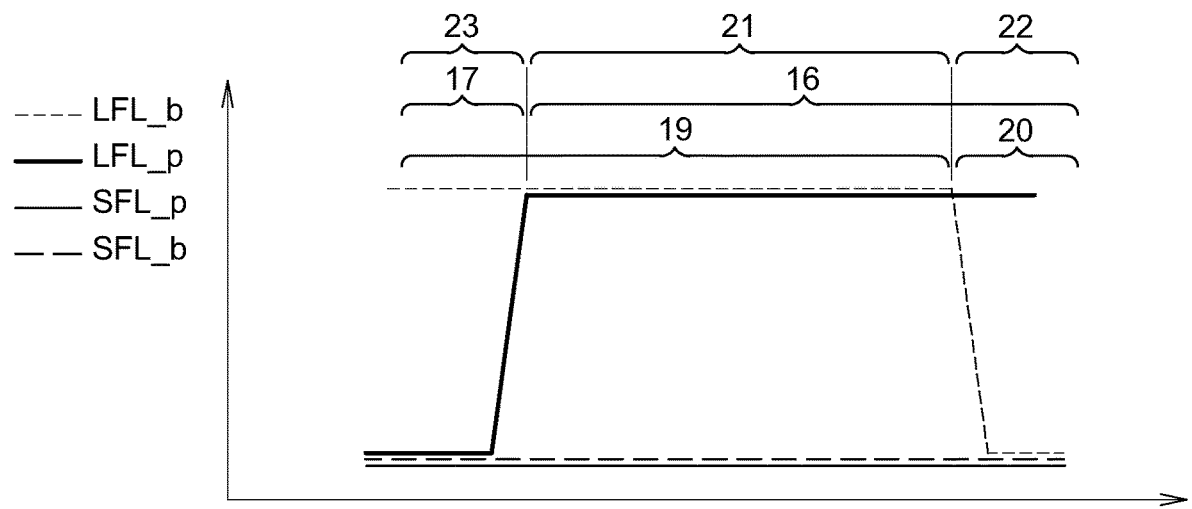
FIG. 5 is a graph of the type of FIG. 2 according to an alternative embodiment of a connection in accordance with the invention.

Alternatively, according to a second embodiment of the invention, as represented FIG. 5, male and female threaded zones 9, 10 have constant stab flank leads but a unique change in the load flank lead value, said load flank changing locations in the respective male and female threaded zones 9, 10 being at two distinct location.

According to the present invention, only a specific number of threads 11 of each of the male and female threads are in that specific locking configuration, and are involved in the locking region 21. The locking region 210 is away from the first and last thread of the threaded zone 9 and 10. At least first and last threads of both the male and female threaded zones are not in a locking configuration. Locking region 21 represents more than 55%; preferably more than 60%, and even preferably more than 70% of the total make up length of engaged male and female threads 11, i.e. the length of the locking region 21 plus the lengths of both non-locking regions 22 and 23.

For an example, the locking region 21 comprises ten to sixteen threads turns where the female threaded zone 10 in full comprises at least sixteen threads turns, and the male threaded zone 9 in full comprises at least sixteen threads turns.

The threads 11 of the male threaded zone 9 and the female threaded zone 10 comprise perfect threads 26 and imperfect threads 27.

Perfect threads 26 have their crests 13 and roots 15 parallel to the tape generatrix. Moreover, said perfect threads have a constant radial height along the threaded zones 9, 10. Thus, the flanks 12 and 14 of these perfect threads 26 provide a large surface for cooperation with other threads 11.

Imperfect threads 27 are not fully formed on the connection, for instance due to the lack of available material in the wall thickness such that the crests 13 of the threads of the male and female threaded zones 9, 10 are parallel to the longitudinal axis X of the connection as material in the wall thickness become unavailable. This facilitates machining. Imperfect threads 27 are arranged in the second male threaded portion 17. Imperfect threads 27 are arranged in the second female threaded portion 20. Imperfect threads 27 within second male threaded portion 17 and the second female threaded portion 20 improve tension efficiency of the threaded tubular connection.

Threads 11 with the minimum root width are imperfect close to the transition with the non-threaded portions toward the pipe body 3 or 5. Imperfect threads 27 have a lower height than the regular height of the other threads, i.e. perfect threads 26, in the locking region 21.

A middle M of the locking region 21, identified at axial half length of the locking region 21. The connection is defined such that a pitch line average diameter TDavg, which is the average radial distance between the longitudinal axis X and a pitch line 28 (see FIG. 6) passing through the halfway of the load flanks 12 radial height of the threads 11 in the locking region 21, at the middle locking location M is as follows $$(OD\text{min}+ID\text{min})\div 2 < TD\text{avg} < (OD\text{max}+ID\text{max})\div 2$$

In which ODmin is a minimal pipe body 3 or 5 outer diameter, i.e. a nominal pipe body 3 or 5 outer diameter as defined for instance by API minus the manufacturing tolerances, Idmin is a minimal male member 4 inner diameter, i.e. or a drift minimum outer diameter as defined for instance in API, ODmax is a maximum pipe body 3 or 5 outer diameter, i.e. a nominal pipe body 3 or 5 outer diameter as defined for instance by API plus the manufacturing tolerances, and Idmax is the maximum male element 4 inner diameter, i.e. or a drift maximum outer diameter as defined for instance in API.

According to one example of the first embodiment of the invention,

OD=7.625 in or 193.675 mm

API maximum pipe OD tolerance ODmax is 101% of the nominal pipe body outer diameter and ODmin is 99.5% of the nominal pipe body outer diameter. Thus, $$OD\text{max}=193.675*1.01=195.61175, \text{ and}$$

$$OD\text{min}=193.675*0.995=192.706625.$$

API minimum wall thickness tolerance WTmin is 87.5% of the remaining pipe body wall thickness.

$$ID\text{max}=OD\text{max}-2*WT\text{min}=193.675*1.01\times 2*9.525*0.875=178.943$$

$$ID\text{min}=OD\text{min}--2*WT=193.675*0.995- 2*9.525=173.656625$$

In order to have the middle M at the middle of the connection, an acceptable pitch line diameter TDavg at the middle locking location M is an average of nominal OD and ID.

$$183.181625=(192.706625+173.656625)/2<TD\text{avg}< (195.61175+178.943)/2=187.277375$$

Thanks to the invention and the above definition of the pitch line average diameter TDavg, perfect threads 26 are dedicated to the locking region 21, even considering worst case API pipe tolerances. Preferably, as the length of the perfect thread zone is governed by pipe parameters and outer diameter tolerances, the perfect threaded zone is selected to have perfect thread over a length longer than the required locking region 21.

The length of the locking region 21 is further defined according to a distance between the middle locking location M, which is identified at axial half length of the locking region 21, and the first and second sides 24 and 25 of said locking region 21. A length Lnl from the middle locking location M to a longitudinal side 24 or 25 of the locking region 21, either the first longitudinal side 24 of the locking region 21 or the second longitudinal side 25 of the locking region 21, is such that $$Lnl \geq (TD\text{avg}-BCCSD-2\times TH\text{pitch}) \div \text{taper}$$

in which THpitch is a vertical distance from pitch line 28 to root 15 or crest 13 in the locking region, BCCSD is the box critical cross section diameter, and taper is the taper of the threaded zone 9 or 10, i.e. tan(θ) as explained below.

BCCSD is defined as the diameter of the female member at the location of the junction between the root 15 and the load flank 12 of the engaged thread 11 closest from the second pipe body 5, in other words the thread 11 of the female threaded zone 10 having its load flank 12 in contact with a corresponding load flank 12 of the male threaded zone 9 and which is the closest from the second pipe body 5.

This definition of the distance between the middle locking location M and the sides of the locking region 21, the threads in the non-locking regions remains with an axial thread width which is large enough to ensure that the connection provide a good behavior in shear or jump-out. Indeed, thanks to said definition of Lnl and the above described definition of TDavg, the middle locking location M is not too close from the terminal surfaces 7 or 8, a middle locking location shifted towards said terminal surfaces 7 or 8 would lead to have front threads of either the male member 4 or the female member 6 too narrow and compromise the connection in either shear or jump-out.

In order to reduce machining costs, the male member 4 and the female member 6 are first blanked at the taper angle θ of the intended threaded zone 9 or 10, and that blanked taper angle θ will become the crest 13 definition of the threads. So, there is no further need to machine thread crests 13. Crests 13 according to that embodiment are parallel to the taper axis of the threaded zones 9, 10, as shown on FIG. 5.

Load flank 12, as well as stab flank 14 of the threads, are successively machined. Run in location for the machining inserts for respectively machining the load flanks 12 and the stab flanks 14 starts within respectively chamfer 72 for the male member 4 and chamfer 81 for the female member 6. Thread machining does not affect terminal surfaces 7 and 8 height, thus providing make up tolerances at the step of introducing the male member 4 into the female member 6 and avoiding to damage to the first stabbing surfaces.

Preferably the machining starts at less than 0.15 mm from the respective terminal surfaces 7 and 8 in the radial direction.

Root 15 of the threads 11 is obtained thanks to the successive use of a first final threading path to machine at least the load flank 12 that is also able to machine part of the root 15 profile adjacent to the load flank 12, and then the use of a second final threading path to machine the stab flank 14 that is also able to machine part of the root 15 profile adjacent to the stab flank 14. There is no need of a third insert to machine the root 15 profile as the root 15 profile evolves from a minimum width value $WR_{pmin}$ to a maximum root width value $WR_{pmax}$ for the male member 4, and from a minimum width value $WR_{bmin}$ to a maximum root width value $WR_{bmax}$ for the female member 6 such that $$WR_{bmax} \leq 2 * WR_{bmin}$$

And $$WR_{pmax} \leq 2 * WR_{pmin}$$

Preferably $$WR_{bmax} \leq 4 \text{ mm}$$

And $$WRb\text{max} \leq 4 \text{ mm}$$

Preferably, $$WRb\text{max} \leq 2 * WR_{bmin} - 0.5 \text{ mm}$$

And $$WRp\text{max} \leq 2 * WR_{pmin} - 0.5 \text{ mm}$$

$WR_{pmin}$ may be about 2.2 mm in one example of the invention.

Alternatives where $WR_{pmax}$ and $WR_{bmax}$ are not in the same plane at the end of make up, as shown on FIG. 1, are also encompassed in the scope of the present invention.

In order to ease make up, a surface treatment is provided to the female member 6 only, and dope is additionally placed around the male member 4 before make up. Alternatively, both the male member 4 and the female member 6 may be surface treated. For example, a surface treatment may be Zinc Phosphate treatment.

The invention claimed is:

1. A threaded connection comprising:
a first tubular component including a first pipe body and a male member, the male member being arranged at a distal end of the first pipe body, an external peripheral surface of the male member comprising at least one male threaded zone, said at least one male threaded zone being arranged along a longitudinal axis of the threaded connection between the first pipe body and a male terminal surface; and
a second tubular component comprising a second pipe body and a female member, the female member being arranged at a distal end of the second pipe body, an internal peripheral surface of the female member comprising at least one female threaded zone, said at least one female threaded zone being arranged along the longitudinal axis of the threaded connection between the second pipe body and a female terminal surface,
wherein the male threaded zone having a first male threaded portion and a second male threaded portion, the first male threaded portion being arranged along the longitudinal axis of the threaded connection between the second male threaded portion and the first pipe body, a width of the thread roots ($WR_{p1}$) of the first male threaded portion decreasing in a direction oriented from the male terminal surface towards the first pipe body, a width of the thread roots ($WR_{p2}$) of the second male threaded portion being constant, said width of the thread roots ($WR_{p2}$) of the second male threaded portion presenting a minimum root width of the male threaded zone, a male thread closest to the male terminal surface presenting a maximum root width value of the male threaded zone,
wherein the female threaded zone comprising a first female threaded portion and a second female threaded portion, the first female threaded portion being arranged along the longitudinal axis of the threaded connection between the second female threaded portion and the second pipe body, a width of the thread roots ($WR_{b1}$) of the first female threaded portion decreasing along a direction oriented from the female terminal surface towards the second pipe body, a width of the thread roots ($WR_{b2}$) of the second female threaded portion being constant, said width of the thread roots ($WR_{b2}$) of the second female threaded portion presenting a minimum root width of the female threaded zone, a female thread closest to the female terminal surface presenting a maximum root width value of the female threaded zone,
wherein the first male treaded portion and the first female threaded portion are partially made up in a self-locking arrangement in order to provide a locking region in the threaded connection and wherein the threaded connection is a flush connection, and
wherein the locking region is located between a first non-locking region and a second non-locking region.

2. The threaded connection according to claim 1, wherein the first male threaded portion comprises at least 90% of perfect threads and wherein the first female threaded portion comprises at least 90% of perfects threads.

3. The threaded connection according to claim 1, wherein the locking region of the made-up connection represents represent more than 55% of the total make up length of engaged male and female threads.

4. The threaded connection according to claim 1, wherein the male threaded zone comprises a single continuous spiral such that a lead of the male stab flanks (SFL_p) changes at a single male stab flanks changing location on the male threaded zone, and the female threaded zone comprises a single continuous spiral such that a lead of the female stab flanks (SFL_b) changes at a single female stab flank changing location on the female threaded zone, the male stab flank changing location and the female stab flank changing location being at different locations along the longitudinal axis of the threaded connection such that the locking region is defined between the male stab flank changing location and the female stab flank changing locations, and wherein a lead of the male load flanks (LFL_p) remains constant along the male threaded zone and a lead of the female load flanks (LFL_b) remains constant along the female threaded zone.

5. The threaded connection according to claim 1, wherein the male threaded zone comprises a single continuous spiral such that a lead of the male load flanks (LFL_p) changes at a single male load flank changing location on the male threaded zone, and the female threaded zone comprises a single continuous spiral such that a lead of the female load flanks (LFL_b) changes at a single female load flank changing location on the female threaded zone, the male load flank changing location and female load flank changing location being at different locations along the longitudinal axis of the threaded connection such that the locking region is defined between the male load flank changing location and the female load flank changing location, and wherein a lead of the male stab flanks (SFL_p) remains constant along the male threaded zone and a lead of the female stab flanks (SFL_b) remains constant along the female threaded zone.

6. The threaded connection according to claim 1, wherein a wedge ratio in the locking region is below 0.2 mm.

7. The threaded connection according to claim 1, wherein the male and female threaded zones have a taper generatrix forming a taper angle with the longitudinal axis of the threaded connection, and wherein a taper corresponding to tan (taper angle) is in the range of 1/6 to 1/18, and wherein crests and roots of the male and female threads of the threaded zones are parallel to the taper generatrix in the locking region.

8. The threaded connection according to claim 1, wherein a middle locking location is identified at axial half length of the locking region such that a pitch line diameter TDavg at the middle locking location M is as follows $$(ODmin+IDmin)\div 2 < TDavg < (ODmax+IDmax)\div 2$$

in which ODmin is a minimal pipe body outer diameter,
Idmin is the minimal male element inner diameter,
ODmax is a maximum pipe body outer diameter, and
Idmax is the maximum male element inner diameter.

9. The threaded connection according to claim 1, wherein a middle locking location is identified at axial half length of the locking region such that a length Lnl from that middle locking location to a longitudinal side of the locking region is such that $$Lnl \geq (TDavg - BCCSD - 2 \times THpitch) \div taper$$

in which THpitch is a radial distance from pitch line to root or crest in the locking region,
BCCSD is the box critical cross section diameter,
taper is the taper of the threaded zone.

10. The threaded connection according to claim 1, wherein maximum root width value (WRpmax) of the male threaded zone is set below twice the minimum root width (WRpmin) value of the male threaded zone and/or maximum female root width value (WRbmax) of the female threaded zone is set below twice the minimum root width value (WRbmin) of the female threaded zone $$WRbmax \leq 2 * WRbmin$$

and/or $$WRpmax \leq 2 * Wrpmin.$$

11. The threaded connection according to claim 1, wherein the root of a female thread which is closest to the second pipe body has the same root width as the root of a male thread which is closest to the first pipe body.

12. The threaded connection according to claim 1, wherein respective threads of the second male threaded portion and/or the second female threaded portion have imperfect thread height and or vanishing thread teeth.

13. The threaded connection according to claim 1, wherein the female threaded zone starts as of the female terminal surface and the male threaded zone starts as of the male terminal surface.

14. The threaded connection according to claim 1, wherein the threads of the male threaded zone and the threads of the female threaded zone have a dovetail profile, and, $\alpha$ and $\beta$ are the load and respectively stab flank angle with a perpendicular to the longitudinal axis of the threaded connection, both $\alpha$ and $\beta$ being less than 5°.

15. The threaded connection according to claim 1, wherein both the crests of the male threads and the crests of the female threads are interfering with corresponding roots in the locking region, such that the diameter interference at the root/crest interference is between 0.0020 and 0.0030 times the pipe body nominal outer diameter.

16. The threaded connection according to claim 1, wherein the threaded connection is free from any distal abutment surface, the male terminal surface being axially away from the female member, and respectively the female terminal surface being axially away from the male member.

17. The threaded connection according to claim 1, wherein both male and female member are free of any additional sealing surfaces beside the locking region.

18. The threaded connection according to claim 1, wherein the first tubular component and the second tubular component are integral, each of the first tubular component and the second tubular component comprising a male member and a female member.

19. The threaded connection according to claim 1, wherein the male threaded zone and the female threaded zone are made of single start threads.

* * * * *